US010678832B2

(12) United States Patent
Kumaran et al.

(10) Patent No.: US 10,678,832 B2
(45) Date of Patent: Jun. 9, 2020

(54) SEARCH INDEX UTILIZING CLUSTERS OF SEMANTICALLY SIMILAR PHRASES

(71) Applicant: Apple Inc., Cupertino, CA (US)

(72) Inventors: Saravana Kumar Siva Kumaran, Fremont, CA (US); Jiayan Gan, San Jose, CA (US); Mohamed Temraz, San Francisco, CA (US); Santosh Shankar, Fremont, CA (US)

(73) Assignee: Apple Inc., Cupertino, CA (US)

( * ) Notice: Subject to any disclaimer, the term of this patent is extended or adjusted under 35 U.S.C. 154(b) by 302 days.

(21) Appl. No.: 15/721,711

(22) Filed: Sep. 29, 2017

(65) Prior Publication Data

US 2019/0102400 A1    Apr. 4, 2019

(51) Int. Cl.
  *G06F 16/35* (2019.01)
  *G06F 16/31* (2019.01)
  *G10L 15/18* (2013.01)
  *G06F 16/28* (2019.01)

(52) U.S. Cl.
  CPC ............ *G06F 16/355* (2019.01); *G06F 16/31* (2019.01); *G06F 16/358* (2019.01); *G10L 15/1815* (2013.01); *G06F 16/287* (2019.01)

(58) Field of Classification Search
  CPC .... G06F 16/34; G06F 16/24578; G06F 17/21; G06F 17/278; G06F 16/325; G06F 16/285; G06F 16/355; G06N 5/02
  See application file for complete search history.

(56) References Cited

U.S. PATENT DOCUMENTS

| 8,510,308 | B1  |   | 8/2013  | Pasca et al. |
|-----------|-----|---|---------|------------------------|
| 9,514,098 | B1  | * | 12/2016 | Subramanya ........... G06F 17/21 |
| 10,049,148| B1  | * | 8/2018  | Fang ..................... G06F 16/285 |
| 2008/0319971 | A1 |  | 12/2008 | Patterson |
| 2009/0089047 | A1 |  | 4/2009  | Pell et al. |
| 2009/0327337 | A1 | * | 12/2009 | Lee ......................... G06N 5/02 |

(Continued)

OTHER PUBLICATIONS

Bahle, "Efficient Phrase Querying," Mar. 2003, pp. 34-62, retrieved from https://pdfs.semanticscholar.org/a376/16e00e5537cacc3c96090153faceedb88136.pdf.

(Continued)

*Primary Examiner* — Etienne P Leroux
(74) *Attorney, Agent, or Firm* — Morgan, Lewis & Bockius LLP

(57) ABSTRACT

The subject technology provides a search index that maps clusters of semantically similar phrases to documents that contain any one of the phrases of the respective cluster. The subject technology may identify the phrases from a set of documents, such as a document corpus, where each of the documents is associated with a document identifier. The subject technology may generate the clusters of semantically similar phrases from the identified phrases, where each of the generated clusters is assigned a cluster identifier. The subject technology generates an index that stores each respective cluster identifier of each respective cluster in association with each document identifier of each of the documents that includes at least one of the phrases contained in the respective cluster. Further, the subject technology stores the index in a memory such that the index may be subsequently utilized to identify documents that match a search query.

20 Claims, 8 Drawing Sheets

(56) References Cited

U.S. PATENT DOCUMENTS

| | | | | |
|---|---|---|---|---|
| 2010/0287173 | A1* | 11/2010 | Schneider | G06F 16/325 707/759 |
| 2012/0296902 | A1* | 11/2012 | Deolalikar | G06F 16/34 707/737 |
| 2015/0088491 | A1* | 3/2015 | Fume | G06F 17/278 704/9 |
| 2015/0088896 | A1* | 3/2015 | Gehrking | G06F 16/24578 707/739 |

OTHER PUBLICATIONS

International Search Report and Written Opinion from PCT/US/2018/045860, dated Oct. 11, 2018, 18 pages.

"Semantic similarity," From Wikipedia, the free encyclopedia, retrieved on Sep. 22, 2017 from https://en.wikipedia.org/wiki/Semantic_similarity, last edited Sep. 11, 2017, 11 pages.

"Word2vec," From Wikipedia, the free encyclopedia, retrieved on Sep. 22, 2017 from https://en.wikipedia.org/wiki/Wprd2vec, last edited Sep. 17, 2017, 5 pages.

\* cited by examiner

600

|  | MMF IN MEMORY MODE | MMF IN FILE MODE | NATIVE IN MEMORY HASH TABLE |
|---|---|---|---|
| PRE-LOADING TIME (MS) | 0 | 0 | 3,383,295 |
| MEMORY CONSUMPTION (MB) | 23,009 | 1.4 | 60,163 |

MMF: MEMORY MAPPED FILE

625

|  | MMF IN MEMORY MODE | MMF IN FILE MODE |
|---|---|---|
| AVG LOOK UP TIME (MS) | 0.002 | 0.035767 |
| MAX LOOK UP TIME (MS) | 15.8 | 24.3 |
| MEMORY CONSUMPTION (MB) | 23,009 | 1.4 |

MMF: MEMORY MAPPED FILE

650

|  | A | B | C | D |
|---|---|---|---|---|
| RAW DATA SIZE (BYTE) | 9355739336 | 1665130094 | 54294916074 | 41455436304 |
| MMAP DATA SIZE (BYTE) | 7010374308 | 1440989228 | 23560401892 | 10469714700 |
| COMPRESSION RATIO | 0.74 | 0.86 | 0.43 | 0.25 |

*FIG. 6*

SEARCH INDEX UTILIZING CLUSTERS OF SEMANTICALLY SIMILAR PHRASES

TECHNICAL FIELD

The present description relates to a search index, including an inverted search index that maps clusters of semantically similar phrases to documents.

BACKGROUND

Search engines may utilize search indexes to provide search results that correspond to documents that match a search query. For example, an inverted search index may map search phrases to documents that contain the phrases. Thus, when a search query is received, the documents that contain the specific phrases of the query can be quickly identified.

BRIEF DESCRIPTION OF THE DRAWINGS

Certain features of the subject technology are set forth in the appended claims. However, for purpose of explanation, several embodiments of the subject technology are set forth in the following figures.

FIG. 6 illustrates example tables that include performance metrics for pre-load time, lookup time, memory consumption, compression ratio when utilizing a memory mapped file in accordance with one or more implementations.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

For performing a search, such as a web search, a device search, and the like, a received search query may include phrases that are matched to one or more documents. Existing approaches may involve searching a search index, such as an inverted search index, for documents that match one or more of the phrases included in the search query. In an example, an inverted search index may map respective phrases to one or more documents that include at least one occurrence of the respective phrase. Utilizing query expansion techniques, semantically similar phrases may be associated with each other. However, some existing techniques may perform additional searches on the search index for the semantically similar phrases, which may require increased processing/memory resources, as well as resulting in increased latency.

The subject technology provides a search index, which may be referred to as an interpretation index, that maps respective clusters of semantically similar phrases to documents that include at least one occurrence of any one of the phrases of the respective cluster. For example, a phrase and any semantically similar phrases may be grouped in a cluster that is assigned a cluster identifier. The search index maps each cluster identifier to document identifiers corresponding to documents that include at least one occurrence of any one of the phrases of the corresponding cluster. The subject technology may also provide a shared memory structure that maps each phrase to the cluster identifier(s) of the cluster(s) that the phrase belongs to. In this manner, the cluster identifiers mapped to a given phrase can be quickly located within the search index, and documents corresponding to the cluster identifiers may be quickly identified.

Thus, the subject technology provides a search index that allows for documents to be searched for a phrase, as well as semantically similar phrases, in a single lookup, thereby reducing processing/memory resources for performing the search, as well as reducing latency for providing the search results, e.g., as compared to the existing search techniques described above.

Figure 1:
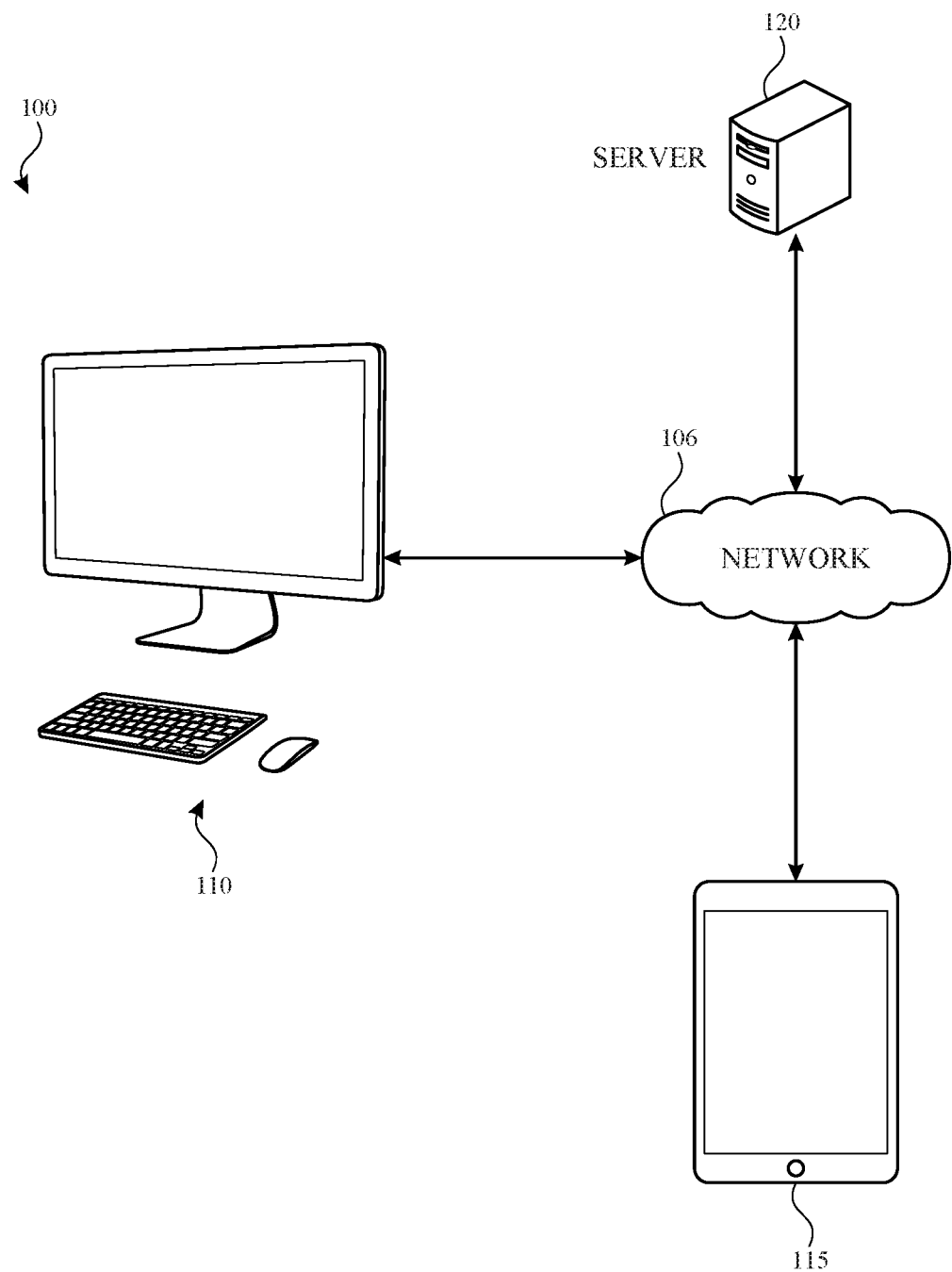
FIG. 1 illustrates an example network environment in which a search index utilizing clusters of semantically similar phrases may be implemented in accordance with one or more implementations.

FIG. 1 illustrates an example network environment 100 in which a search index utilizing clusters of semantically similar phrases may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, an electronic device 115, and a server 120. The network 106 may communicatively (directly or indirectly) couple the electronic device 110 and/or the server 120, the electronic device 115 and/or the server 120, and/or electronic device 110 and/or the electronic device 115. In one or more implementations, the network 106 may be an interconnected network of devices that may include, or may be communicatively coupled to, the Internet. For explanatory purposes, the network environment 100 is illustrated in FIG. 1 as including an electronic device 110, an electronic device 115, and a server 120; however, the network environment 100 may include any number of electronic devices and any number of servers.

The electronic device 110 may be, for example, desktop computer, a portable computing device such as a laptop computer, a smartphone, a peripheral device (e.g., a digital camera, headphones), a tablet device, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 110 is depicted as a desktop computer. The electronic device 110 may be, and/or may include all or part of, the electronic system discussed below with respect to FIG. 7. In one or more implementations, the electronic device 110 may provide a system for receiving input for a search query including phrases, and transmitting the search query over the network 106 to the server 120.

The electronic device 115 may include a touchscreen and may be, for example, a portable computing device such as a laptop computer that includes a touchscreen, a smartphone that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 115 may not include a touchscreen but may support touchscreen-like gestures, such as in a virtual reality or augmented reality environment. In one or more implementations, the electronic device 115 may include a touchpad. In FIG. 1, by way of example, the electronic device 115 is depicted as a tablet device with a touchscreen. In one or more implementations, the electronic device 115 may be, and/or may include all or part of, the electronic device discussed below with respect to the electronic system discussed below with respect to FIG. 7. In one or more implementations, the electronic device 115 may also provide a system for receiving input for a search query including phrases, and transmitting the search query over the network 106 to the server 120.

In one or more implementations, the server 120 implements a search index that maps clusters of phrases to documents that contain any of the phrases of the respective cluster. An example process for generating a search index that utilizes clusters of phrases is discussed further below with respect to FIG. 5. The search index may be utilized to quickly identify documents that match a given phrase and/or that match any phrases that are semantically similar to the given phrase. An example process for searching a search index that utilizes clusters of phrases is discussed further below with respect to FIG. 6, and an example software architecture that provides for generating and searching such a search index is discussed further below with respect to FIG. 2. The search index of the subject system may allow semantic searches to be performed with reduced processing/memory resources, as well as reduced latency, as compared to existing semantic search techniques, as is discussed further below with respect to FIGS. 4A and 4B.

As used herein, a phrase can include one or more terms. Respective phrases may have semantic relationships with each other including, for example, a relationship of being semantically similar and/or a relationship of being semantically related. Semantically similar phrases or similar phrases, as used herein, can be determined based on a metric corresponding to a distance between a given first phrase and a given second phrase in which the distance indicates a likeness of the meaning or semantic content of the respective phrases, e.g., as opposed to the syntactical representation (e.g., string format) of respective phrases. Additionally, semantically related phrases can be determined based on a particular relation between respective phrases. For example, the phrase "boat" may be semantically similar to the phrase "ferry", and the phrase "boat" may be semantically related to the phrase "ocean," but the phrase "boat" may not be semantically similar to the phrase "ocean."

Figure 2:
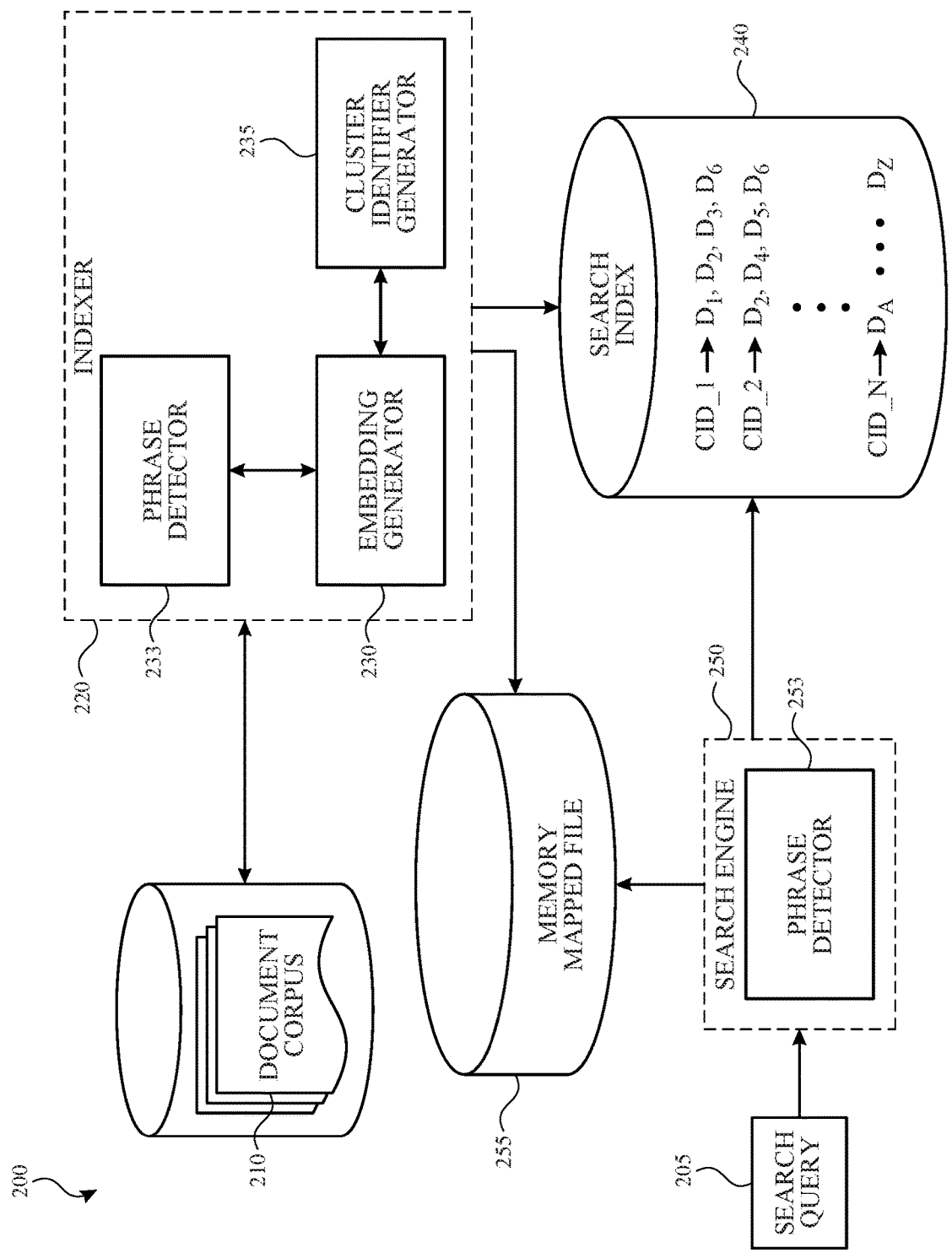
FIG. 2 illustrates an example software architecture that provides for generating and searching a search index that utilizes clusters of semantically similar phrases in accordance with one or more implementations.

FIG. 2 illustrates an example software architecture 200 that provides for generating and searching a search index that utilizes clusters of semantically similar phrases in accordance with one or more implementations. For explanatory purposes, the software architecture 200 is described as being provided by the server 120 of FIG. 1, such as by a processor and/or memory of the server 120; however, the software architecture 200 may be implemented by any other electronic device. For example, all or part of the software architecture 200 may be implemented by one or more of the electronic devices 110, 115, such as for generating a search index for local searches. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, the software architecture 200 includes an indexer 220 that includes a phrase detector 233, an embedding generator 230, and a cluster identifier generator 235. The indexer 220 starts processing a document corpus 210, which includes a set of documents that contain text. Such documents may include content from respective websites (e.g., web pages) or other sources (e.g., emails, or documents on a file system, etc.), or any other appropriate source. Each document in the document corpus 210 may be associated with a document identifier, such as a random identifier, or any other identifier.

In one or more implementations, the phrase detector 233 detects phrases from the document corpus 210 utilizing any appropriate phrase detection technique. The phrase detector 233 sends detected phrases to the embedding generator 230 for further processing as described below.

In at least one implementation, the embedding generator 230 may utilize a machine learning model to generate vector representations of phrases (e.g., based on word embeddings) found in documents from the document corpus 210. In an example, vector representations of phrases enable semantically similar phrases to be mapped to nearby points with other similar phrases in a vector space.

The embedding generator 230 may provide the vector representations of phrases to a cluster identifier generator 235. The cluster identifier generator 235, in an example, generates respective cluster identifiers for each of the phrases. In one or more implementations, the cluster identifier generator 235 determines similar phrases of each phrase, ranks the similar phrases by distance, and selects a subset of the ranked similar phrases for associating to each phrase. In an example, similar phrases may have similar vector representations, and their distances to one another may be compared in order to determine which phrases are similar. The cluster identifier generator 235 assigns a given phrase (and its associated semantically similar phrases) to a generated cluster identifier, which may be randomized identifier (e.g., one that is randomly generated), in an example. In an example, phrases may be filtered using a de-duping technique to avoid having duplicative clusters. In this manner, the phrase and its semantically similar phrases are assigned to a particular generated cluster identifier. It is appreciated, however, that the cluster identifier generator 235 may provide any type of appropriate identifier other than a randomized identifier.

In an implementation, for each cluster identifier, the cluster identifier generator 235 (and/or another component of the indexer 220) associates the cluster identifier to the document identifiers of the documents (e.g., from the document corpus 210) that include at least one occurrence of any of the phrases associated with the cluster. The cluster identifier generator 235 stores each cluster identifier and associated document identifiers in a search index 240, which may be searched upon to process incoming search queries. As shown, the search index 240 includes 1 to n number of cluster identifiers, and each cluster identifier is associated with a set of document identifiers for different documents. In one example, the search index 240 may be implemented using a distributed file system (e.g., Hadoop), and may be stored on one or more electronic devices (e.g., in a cluster of servers). An example process for generating the search index 240 is discussed further below with respect to FIG. 5.

The cluster identifier generator 235 may store a memory mapped file (MMF) 255 including a mapping of phrases (e.g., found in documents from the document corpus 210) to generated cluster identifiers of the clusters that contain the phrases. An example data structure for implementing the MMF 255 is described further below with respect to FIG. 3, and example processes for generating cluster identifiers is described further below with respect to FIGS. 4A and 4B. The MMF 255 may enable lookups of cluster identifiers corresponding to phrases, e.g. phrases of a search query. Such lookups may be initially performed for each phrase of a search query to determine the cluster identifiers corresponding to each phrase. The cluster identifiers may then be utilized to search the search index 240 for document identifiers associated with the cluster identifiers, and thereby identify documents that include the phrases of the search query and/or that include phrases that are semantically similar to the phrases of the search query.

The software architecture 200 includes a search engine 250 that receives a search query 205. In an example, the search query 205 may be received over the network 106 from the electronic device 110 or the electronic device 115. The search engine 250, in one or more implementations, includes a phrase detector 253. The phrase detector 253, using any appropriate phrase detection technique, may detect phrases from the search query 205. For each detected phrase from the search query 205, the search engine 250 determines cluster identifiers associated with the phrase by performing a lookup on the MMF 255. Using the determined cluster identifiers from the MMF 255, the search engine 250 may search the search index 240 and determine the document identifiers that are associated with each of the cluster identifiers.

In at least an implementation, the search engine 250 may determine an intersection of documents that are associated with each cluster identifier of a given phrase. For example, a given phrase may be associated with "CID_1" and "CID_2" in the search index 240. The "CID_1" cluster identifier may be associated with document identifiers $D_1$, $D_2$, $D_3$, $D_6$, and the "CID_2" cluster identifier may be associated with document identifiers $D_2$, $D_4$, $D_5$, and $D_6$. Thus, an intersection of these document identifiers would result in documents with document identifiers $D_2$ and $D_6$ being provided as a result. The documents that are provided as a result of the intersection operation may be provided to a relevance engine that determines a ranking of these documents for including in a set of search results (and/or for filtering from the set of search results) based on a relevance ranking or score. An example process for searching the search index 240 is further described in FIG. 6 below.

Figure 3:
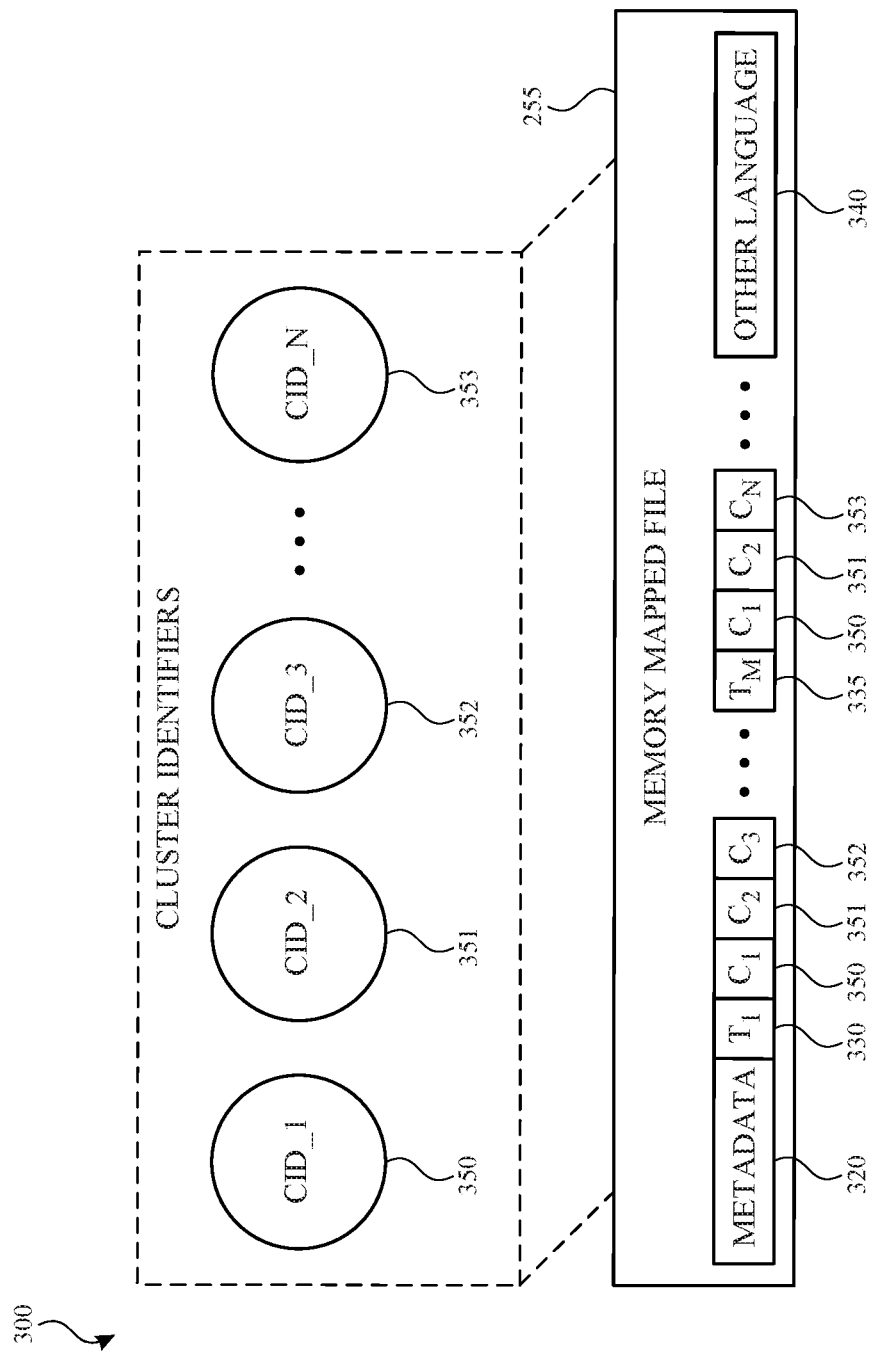
FIG. 3 illustrates an example data structure for a shared memory structure that maps phrases to clusters of semantically similar phrases in accordance with one or more implementations.

FIG. 3 illustrates an example data structure 300 for a shared memory structure that maps phrases to clusters of semantically similar phrases in accordance with one or more implementations. The example data structure, in an example, may correspond to the MMF 255 described above in FIG. 2, which is described in further detail below in the following discussion.

As illustrated, the data structure 300 in at least one implementation includes the MMF 255 described above in FIG. 2. The MMF 255 can be implemented as a shared memory structure stored in memory (e.g., volatile memory such as RAM) that corresponds to a file on disk (or any other appropriate storage location in non-volatile memory such as a hard disk, flash memory, etc.). In another example, the MMF 255 may be stored on disk (e.g., not in volatile memory) and read directly from the disk. In comparison with a given search index that utilizes a hash table for performing search queries, the MMF 255 can provide improved performance for performing search queries and reduces memory usage (which is discussed in more detail in FIG. 5 below). The MMF 255, in at least an implementation, may be compressed using an appropriate compression scheme to reduce memory usage and potentially provide improved performance.

In one or more implementations, the MMF 255 is an array in which different locations in the array can be accessed using an index into the array. The MMF 255 includes metadata 320 at the beginning of the array, a set of phrases including phrase 330 up to m number of phrases (where m represents a non-zero integer) as represented by a phrase 335. The set of phrases belonging to a particular language (e.g., English) are grouped together in a block of memory spanning a consecutive range of locations in the MMF 255. As illustrated, the MMF 255 is structured such that each phrase in the MMF 255 is associated with a particular set of cluster identifiers that are stored contiguously in the MMF 255 after the phrase. For example, the phrase 330 is stored in the MMF 255 before its set of cluster identifiers including cluster identifiers 350, 351, and 352. Similarly, the phrase 335 is stored in the MMF 255 before its set of cluster identifiers including cluster identifiers 350, 351, 353. The phrases in the MMF 255 may be sorted according to a particular order (e.g., alphabetically according to the language).

Although for the purposes of explanation the phrases 330 and 335 are illustrated as associated with three different cluster identifiers, it is understood that any number of different cluster identifiers up to the total number of cluster identifiers provided may be associated with a given phrase. In the example of FIG. 3, a number of cluster identifiers currently provided can range from 1 up to n number of cluster identifiers (e.g., as illustrated by cluster identifiers 350, 351, 352, and 353) such that up to n number of cluster identifiers may be associated with a given phrase in the MMF 255.

By way of example, the search engine 250 may determine associated cluster identifiers for each phrase from a given search query. For example, the search engine 250 may perform a lookup for a phrase corresponding to the phrase 330, and determine that the phrase is associated with the cluster identifiers 350, 351, and 352. Subsequently, the search engine 250 may search a search index (e.g., the search index 240) to determine associated document identifiers for each of the cluster identifiers 350, 351, and 352 for the phrase from the search query. As mentioned above, these document identifiers may be provided to a relevance engine for ranking and/or filtering to provide relevant search results for the search query, which may include search results corresponding to one or more of the documents identified by the document identifiers.

In one or more implementations, the MMF 255 may be segmented such that phrases in a particular first language are separated from phrases from a different second language. As illustrated, the MMF 255 may include a block of memory 340 subsequent to the phrases 330 and 335 that include a set of phrases in a different second language (e.g., French). The block of memory in the MMF 255 may be structured in a similar way as described above such that each phrase in the second language is associated with a respective set of cluster identifiers, and each phrase and its set of cluster identifiers are stored in a contiguous manner with other phrases and their cluster identifiers. It is appreciated that any number of different languages may be included in the MMF 255 in this manner (e.g., a third different language can be included in a subsequent block of memory after the block of memory 340).

Figure 4A:
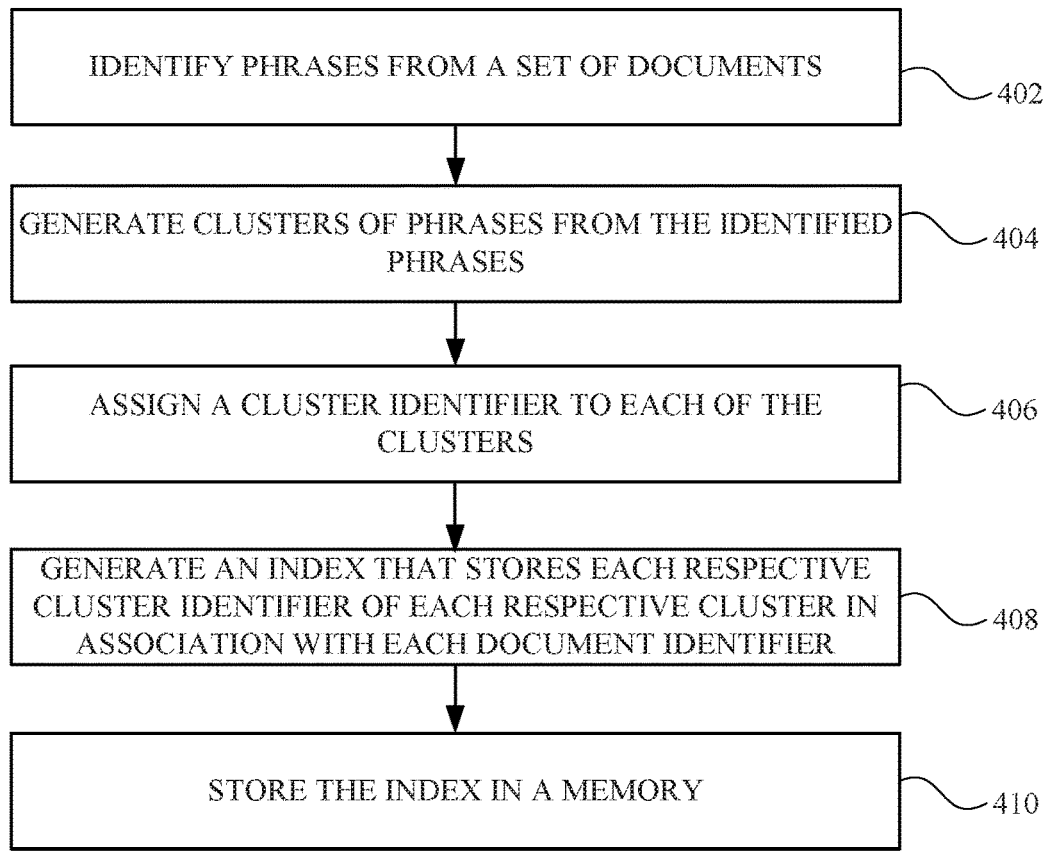
FIG. 4A illustrates a flow diagram of an example process for generating a search index that utilizes clusters of semantically similar phrases in accordance with one or more implementations.

FIG. 4A illustrates a flow diagram of an example process 400 for generating a search index that utilizes clusters of semantically similar phrases in accordance with one or more implementations. For explanatory purposes, the process 400 is primarily described herein with reference to components of the software architecture of FIG. 2 (particularly with reference to the indexer 220), which may be executed by one or more processors of the server 120 of FIG. 1. However, the process 400 is not limited to the server 120, and one or more blocks (or operations) of the process 400 may be performed by one or more other components of other suitable devices, such as one or more of the electronic devices 110, 115. Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be replaced by other operations.

The indexer 220 identifies phrases from a set of documents (402). For example, each of the documents is associated with a document identifier, and the set of documents are included in a document corpus (e.g., the document corpus 210). The indexer 220 generates clusters of phrases from the identified phrases (404). In an example, the phrases contained in each respective duster are semantically similar. Generating dusters of phrases from the identified phrases can further include selecting a particular phrase for forming one of the clusters, determining similar phrases for the particular phrase using a machine learning model, ranking the determined similar phrases for the particular phrase, where ranking each respective similar phrase is based on a distance between the particular phrase and the respective similar phrase, and selecting, based on the ranking, a subset of the ranked similar phrases to be included in the one of the clusters with the particular phrase.

The indexer 220 assigns a cluster identifier to each of the clusters (406), which may be a randomized identifier in an example. The indexer 220 generates an index (e.g., the search index 240) that stores each respective cluster identifier of each respective cluster in association with each document identifier of each of the documents that includes at least one of the phrases contained in the respective cluster (408). The indexer 220 then stores the index in a memory (410).

Figure 4B:
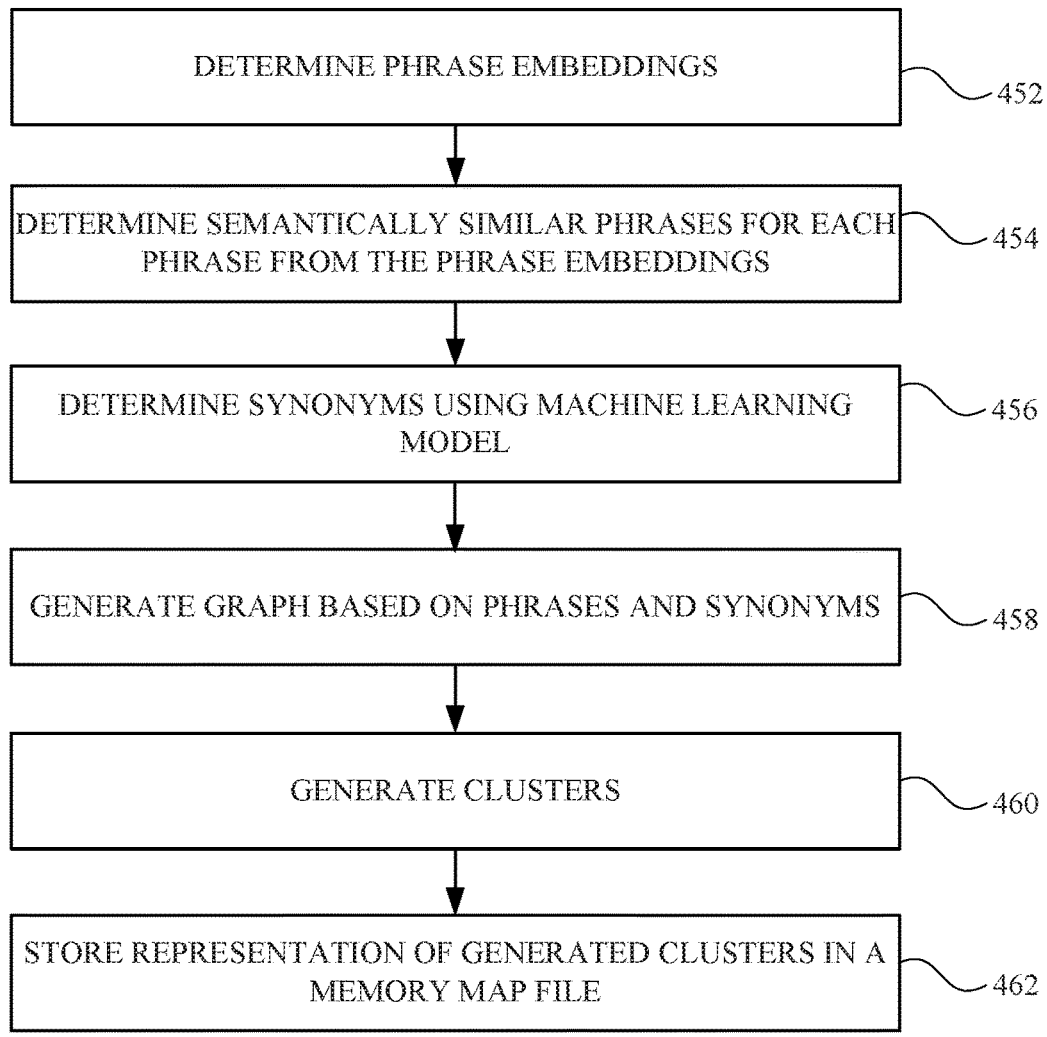
FIG. 4B illustrates a flow diagram of an example process for generating clusters of semantically similar phrases for storing in a memory mapped file in accordance with one or more implementations.

FIG. 4B illustrates a flow diagram of an example process 450 for generating clusters of semantically similar phrases for storing in a memory mapped file in accordance with one or more implementations. In an example, one or more block (or operations) of the process 450 may be performed in conjunction with one or more blocks (or operations) of the process 400 described above. For explanatory purposes, the process 450 is primarily described herein with reference to components of the software architecture of FIG. 2 (particularly with reference to the indexer 220), which may be executed by one or more processors of the server 120 of FIG. 1. However, the process 450 is not limited to the server 120, and one or more blocks (or operations) of the process 450 may be performed by one or more other components of other suitable devices, such as one or more of the electronic devices 110, 115. Further for explanatory purposes, the blocks of the process 450 are described herein as occurring in serial, or linearly. However, multiple blocks of the process 450 may occur in parallel. In addition, the blocks of the process 450 need not be performed in the order shown and/or one or more blocks of the process 450 need not be performed and/or can be replaced by other operations.

The indexer 220 determines phrase embeddings on a given set of phrases (e.g., detected phrases from the document corpus 210) (452). In an example, a neural network (or any other appropriate machine learning model) can be utilized by the indexer 220 to determine the phrase embeddings on the detected phrases. Such a neural network can provide, as output, a vector representation of each of the detected phrases.

The indexer 220 determines semantically similar phrases for each phrase from the determined phrase embeddings (454). In at least one implementation, the indexer 220 determines the semantically similar phrases for each phrase in the determined phrase embeddings using distance computations. Such distance computations can include determining a cosine similarity or cosine distance between the respective vector representations of each phrase. In this example, a range of similarity values can 1) start from a representation of no similarity between two respective phrases that corresponds to a ninety (90) degree angle, and 2) end at a representation of total similarity that corresponds to a zero (0) degree angle indicating a complete overlap between the respective phrases.

The indexer 220 determines synonyms using a machine learning model for each of the phrases (456). In an example, the indexer 220 utilizes an automated validation model to generate synonyms using click graphs, web graphs, and/or edit distances, etc. For example, a click graph can represent information regarding documents that were clicked (or accessed) in connection with a particular search query. A web graph can represent a directed graph in which nodes correspond to respective web pages and a directed edge connects a first page to a second page if there exists a hyperlink on the first page referring to the second page. Further, an edit distance can refer to a minimum number of edit operations required to transform a first phrase into a second phrase.

The indexer 220 generates a graph based on the phrases and the determined synonyms of each of the phrases (458). In an example, the graph includes nodes in which each node corresponds to a respective phrase. A particular node is connected by an edge to another node to indicate that these two nodes correspond to respective phrases that are synonyms. In addition, an edge between interconnected nodes, as an example, can indicate a distance between the nodes. As an illustration, the phrase "Los Angeles" may be a synonym with another phrase corresponding to "Hollywood" with the edge representing the distance between these two phrases.

The indexer 220 generates clusters (460) using the phrases from the graph and based at least on a threshold amount of change in a centroid of a given cluster. In an example, the indexer 220 may select two respective interconnected nodes corresponding to a first phrase A and a second phrase B and group these nodes into a first cluster. The indexer 220 may determine an initial centroid of this first cluster. In one or more implementations, the centroid of the cluster may be determined using the distances between the nodes of the cluster and/or the centroid of the cluster may be determined using an average of the vector representations of each phrase in the cluster. For each synonym of phrase A and phrase B (e.g., such synonyms are represented as respective nodes that are connected to the nodes corresponding to phrases A and B), the indexer 220 determines whether adding an additional phrase C corresponding to a potential synonym shifts the centroid of the cluster greater than a predetermined threshold value. Such a threshold value may be determined utilizing a heuristic approach.

In an example, a new centroid is determined based on the vector representations of phrases A, B, and C (and/or the distances between the nodes), and the new centroid is compared to the initial centroid value to determine if a difference between the two centroids is greater than the threshold value. The indexer 220 iterates through each neighbor node for the phrases A and B (e.g., all the nodes connected with the nodes corresponding to phrases A and B) and adds a particular neighbor node to the cluster if the amount of change in the centroid is less than or equal to the threshold value. Further, the indexer 220 can iterate through each neighbor node of the node corresponding to phrase C and also add each neighbor node if the amount of change in the centroid is less than or equal to the threshold value. A neighbor node may refer to any node that is directly or indirectly connected to another node. Finally, the indexer 220 ceases processing the nodes (e.g., at any point in the previously described iterations) when adding a particular node to the cluster would change the centroid greater than the threshold value, which indicates that the cluster has reached saturation.

In at least one implementation, the indexer 220 stores representations of the generated clusters in a memory mapped file (462). In an example, the indexer 220 stores the representations of the generated clusters in accordance with the memory mapped file described before in FIGS. 2 and 3 (e.g., the MMF 255).

Figure 5:
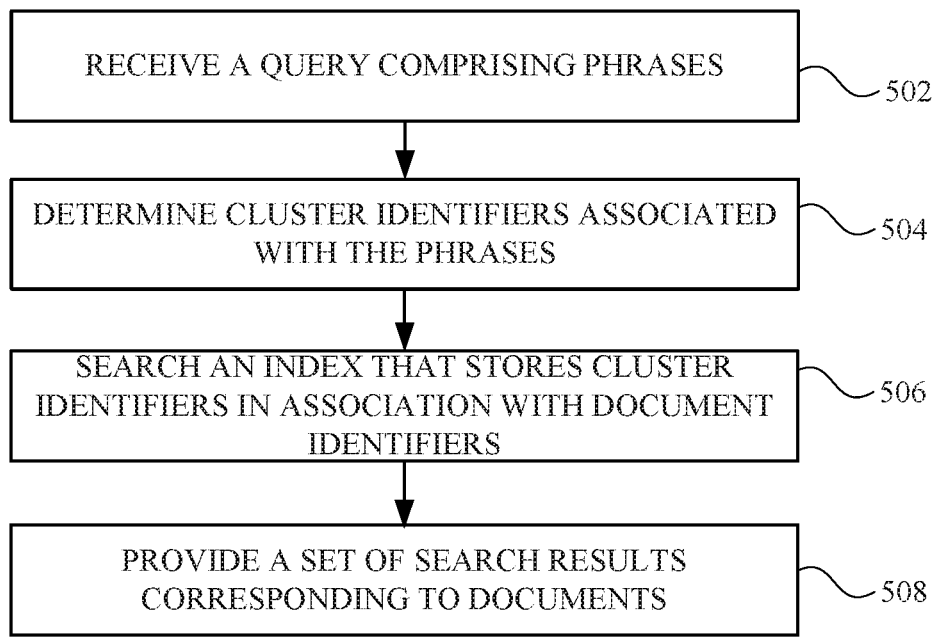
FIG. 5 illustrates a flow diagram of an example process for searching a search index that utilizes clusters of semantically similar phrases in accordance with one or more implementations.

FIG. 5 illustrates a flow diagram of an example process 500 for searching a search index that utilizes clusters of semantically similar phrases in accordance with one or more implementations. For explanatory purposes, the process 500 is primarily described herein with reference to components of the software architecture of FIG. 2 (particularly with reference to the search engine 250), which may be executed by one or more processors of the server 120 of FIG. 1. However, the process 500 is not limited to the server 120, and one or more blocks (or operations) of the process 500 may be performed by one or more other components of other suitable devices, such as one or more of the electronic devices 110, 115. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The search engine 250 receives a query comprising phrases (502). The search engine 250 determines cluster identifiers associated with the phrases (504). In an example, the search engine 250 searches the MMF 255 to determine the cluster identifiers associated with the phrases. The search engine 250 searches the search index 240 to retrieve document identifiers that are each associated with at least one of the cluster identifiers (506). The search engine 250 may then provide a set of search results that correspond to one or more of the documents identified by the retrieved document identifiers (508). In an example, providing the set of search results corresponding to documents identified by the retrieved document identifiers further includes determining a particular set of documents corresponding to the retrieved document identifiers, and providing information corresponding to the particular set of documents as the set of search results.

In one or more implementations, the search engine 250 may determine a relevance score for each of the documents identified by the retrieved document identifiers. The relevance score may indicate a relevance of each of the documents to the received search query. For example, the relevance score for a document may be determined based on a number of occurrences each of the phrases in each of the clusters associated with the document, contextual analysis, inverse document frequency (e.g., to distinguish between common and rare phrases), and/or other relevance determinations. The search engine 250 may rank the documents based on the determined relevance score and may provide search results corresponding to a number of the highest ranked documents.

FIG. 6 illustrates example tables 600, 625, 650 that include performance metrics for pre-load time, lookup time, memory consumption, compression ratio when utilizing a memory mapped file (MMF) in accordance with one or more implementations. The following discussion illustrates example metrics showing improved performance when implementing the memory mapped file with phrases mapped to cluster identifiers in accordance with implementations described herein (e.g., the MMF 255 as described in FIG. 3).

In the examples of tables 600 and 625, MMF data structure is compressed using a compression ratio of 0.43. As illustrated, table 600 includes respective metrics corresponding to pre-loading time and memory consumption for an implementation that utilizes a MMF for performing lookups for cluster identifiers and a second implementation that utilizes a hash table data structure for performing lookups for cluster identifiers. In one or more implementations, the MMF may be running in memory mode or file mode. In an example, memory mode can be used when sufficient memory (e.g., random access memory (RAM)) is available on the electronic device (e.g., the server 120), and file mode can be used when the MMF may not fit into the available amount of memory on the electronic device and accessed directly from storage (e.g., disk). The table 600 indicates that the pre-loading time (in milliseconds) for the MMF is 0 (zero) for both memory and file modes, and the preloading time for the hash table implementation is 3,383, 295 milliseconds. By reducing the preloading time, system performance can be improved by decreasing processing times when the mapped cluster identifiers are loaded into memory. Advantageously, as shown in table 600, the MMF may be running in either memory mode or file mode without any difference in pre-loading time (e.g., both times are zero).

The table 600 further indicates that the memory consumption for the MMF implementation is 23,008 megabytes in memory mode, and 1.4 megabytes in file mode. In comparison, memory consumption for the hash table implementation is 60,163 megabytes. Thus, the MMF implementation when running in file mode is approximately thirty-eight percent of the total memory usage when compared to the hash table implementation. Lower memory usage by the MMF implementation may improve the stability of the system as the remaining amount of available memory can be increased in comparison with the hash table implementation, and thus avoiding instances when the electronic device may run out of memory. Furthermore, the lower memory requirements of the MMF may allow the MMF to reside in RAM for longer periods of time than the hash table, e.g., even when the available RAM becomes constrained.

As illustrated, table 625 includes respective metrics indicating average look up time (in milliseconds), maximum look up time (in milliseconds), and memory consumption of the MMF when running in memory mode and file mode. Look up time can refer to an amount of time in which to locate data in the MMF (e.g., when searching for a particular phrase). The average look up time is 0.002 milliseconds for the MMF in memory mode, and 0.035767 milliseconds for the MMF in file mode. The maximum look up time is 15.8 milliseconds for the MMF in memory mode, and 24.3 milliseconds for the MMF in file mode. By reducing the look up time for cluster identifiers, latency for providing search results may be reduced. As further shown in table 625, memory usage is unchanged and corresponds to the same amounts of memory usage as shown in table 600. It is appreciated that running the MMF in memory mode affords even greater performance increases for look up operations in comparison with the MMF in file mode as accessing the MMF in memory may be overall faster based on the underlying hardware differences between accessing memory versus accessing disk.

As further illustrated, table 650 includes different metrics showing relative data sizes in bytes between raw data (e.g., uncompressed data) and a compressed MMF for four respective data structures A, B, C, and D. A given MMF can be compressed using an appropriate compression scheme with a particular compression ratio shown in table 650. For example, data structure A has a compression ratio of 0.74, data structure B has a compression ratio of 0.86, data structure C has a compression ratio of 0.43, and data structure D has a compression ratio of 0.25. The data structure C in table 650 and its relative data sizes correspond to the metrics corresponding to lookup, pre-load time, and memory consumption shown in tables 600 and 625 discussed above.

Figure 7:
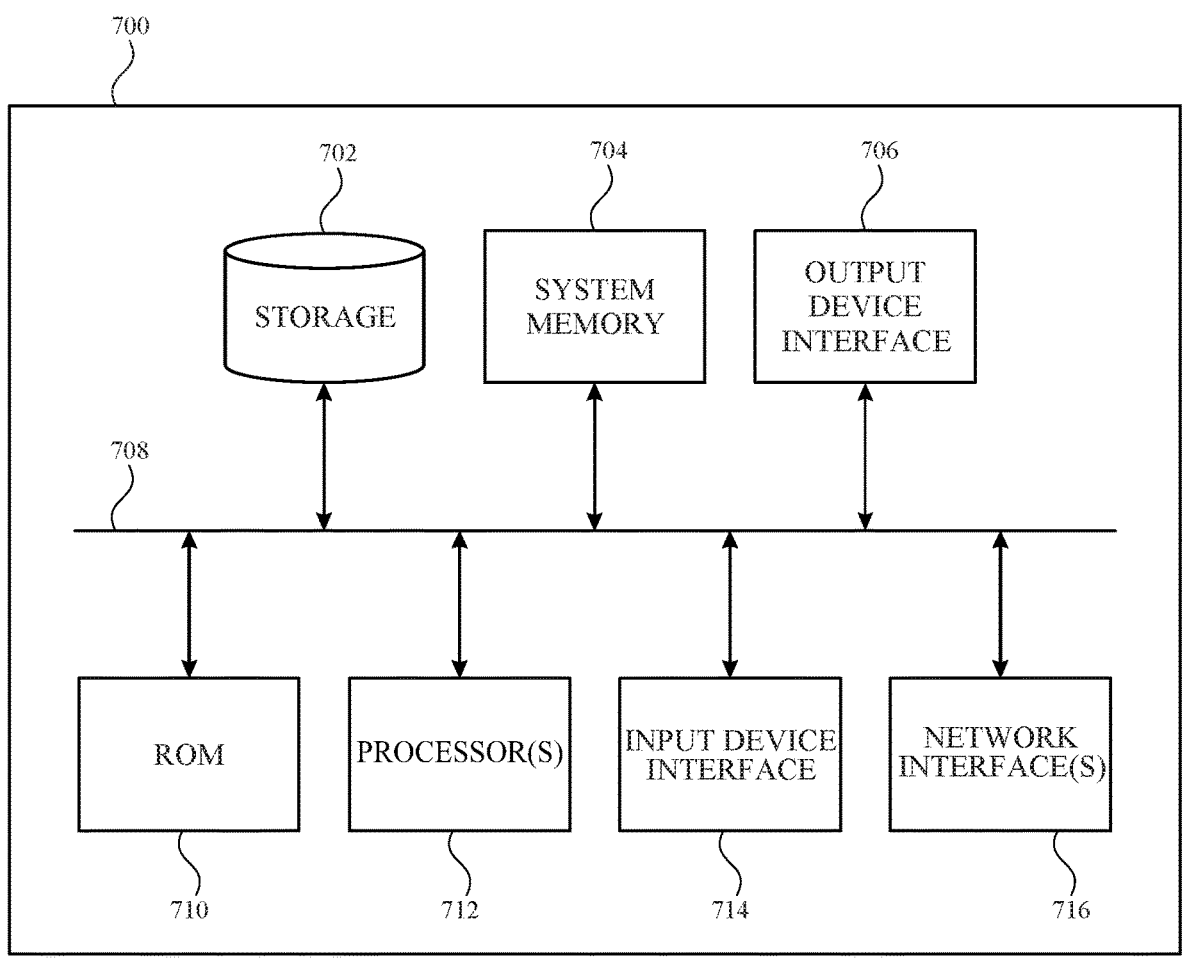
FIG. 7 illustrates an electronic system with one or more implementations of the subject technology may be implemented.

FIG. 7 illustrates an electronic system 700 with which one or more implementations of the subject technology may be implemented. The electronic system 700 can be, and/or can be a part of, the electronic device 110, the electronic device 115, and/or the server 120 shown in FIG. 1. The electronic system 700 may include various types of computer readable media and interfaces for various other types of computer readable media. The electronic system 700 includes a bus 708, one or more processing unit(s) 712, a system memory 704 (and/or buffer), a ROM 710, a permanent storage device 702, an input device interface 714, an output device interface 706, and one or more network interfaces 716, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 712 may need at runtime. In one or more implementations, the processes of the subject disclosure are stored in the system memory 704, the permanent storage device 702, and/or the ROM 710. From these various memory units, the one or more processing unit(s) 712 retrieves instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to one or more networks and/or to one or more network nodes, such as the electronic device 115 shown in FIG. 1, through the one or more network interface(s) 716. In this manner, the electronic system 700 can be a part of a network of computers (such as a LAN, a wide area network ("WAN"), or an Intranet, or a network of networks, such as the Internet. Any or all components of the electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the phrase "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   identifying phrases from a set of documents, each of the documents being associated with a document identifier;
   generating clusters of phrases from the identified phrases, each phrase contained in each respective cluster having a semantic relationship with other phrases in the respective cluster;
   assigning a cluster identifier to each of the clusters of phrases;
   generating an index that stores each respective cluster identifier of each respective cluster of phrases in association with each document identifier of each of the documents that includes at least one of the phrases contained in the respective cluster of phrases;
   receiving a query comprising phrases;
   determining cluster identifiers associated with the phrases;
   searching the index to retrieve document identifiers that are each associated with at least one of the cluster identifiers; and
   providing a set of search results corresponding to documents identified by the retrieved document identifiers.

2. The method of claim 1, wherein the set of documents comprises a document corpus, the cluster identifier comprises a randomized identifier, and the semantic relationship comprises a semantic similarity between respective phrases.

3. The method of claim 1, wherein generating clusters of phrases from the identified phrases further comprises:
   selecting a particular phrase for forming one of the clusters;
   determining similar phrases that have a particular semantic relationship with the particular phrase using a machine learning model;
   ranking the determined similar phrases for the particular phrase, wherein ranking each respective similar phrase is based on a distance between the particular phrase and the respective similar phrase; and
   selecting, based on the ranking, a subset of the ranked similar phrases to be included in the one of the clusters with the particular phrase.

4. The method of claim 3, wherein the distance between the particular phrase and the respective similar phrase is based on the distance between respective vector representations of the particular phrase and the respective similar phrase.

5. The method of claim 1, further comprising:
   storing a shared memory structure, the shared memory structure comprising metadata including information corresponding to a first range of locations in the shared memory structure, the first range of locations including a first set of phrases in a first language, each phrase from the first set of phrases associated with a particular set of cluster identifiers, the particular set of cluster identifiers being stored within the first range of locations in the shared memory structure.

6. The method of claim 5, wherein the metadata further includes information corresponding to a second range of locations in the shared memory structure, the second range of locations corresponding to a second set of phrases in a second language, each phrase associated with a second particular set of cluster identifiers.

7. The method of claim 1, further comprising:
   storing a shared memory structure, wherein the shared memory structure comprises an array, the array includes at least a first phrase from a first set of phrases at a first location in the array and a first plurality of cluster identifiers associated with the first phrase at subsequent locations after the first location in the array, the array includes a second phrase from the first set of phrases at a second location in the array, the second location being after the subsequent locations of the first plurality of cluster identifiers, and the array includes a second plurality of cluster identifiers associated with the second phrase, the second plurality of cluster identifiers at subsequent locations after the second location in the array.

8. The method of claim 7, wherein providing the set of search results corresponding to documents identified by the retrieved document identifiers further comprises:
   determining a particular set of documents corresponding to the retrieved document identifiers; and
   providing information corresponding to the particular set of documents as the set of search results.

9. The method of claim 7, wherein determining cluster identifiers associated with the phrases comprises:
   searching the shared memory structure to determine cluster identifiers associated with the phrases.

10. A system comprising;
    at least one processor; and
    at least one memory device containing instructions, which when executed by the processor cause the at least one processor to:
    identify phrases from a set of documents, each of the documents being associated with a document identifier;

generate clusters of phrases from the identified phrases, each phrase contained in each respective cluster having a semantic relationship with other phrases in the respective cluster;

assign a cluster identifier to each of the clusters;

generate an index that stores each respective cluster identifier of each respective cluster in association with each document identifier of each of the documents that includes at least one of the phrases contained in the respective cluster; and store the index in a memory.

11. The system of claim 10, wherein the set of documents comprises a document corpus, the cluster identifier comprises a randomized identifier, and the semantic relationship comprises a semantic similarity between respective phrases.

12. The system of claim 10, wherein the instructions, when executed by the at least one processor, further cause the at least one processor to:

determine similar phrases that have a particular semantic relationship with a particular identified phrase using a machine learning model;

rank the determined similar phrases for the particular identified phrase, wherein ranking the determined similar phrases is based on a distance between the particular phrase and a particular similar phrase; and select, based on the ranking, a subset of the ranked similar phrases to be included in the respective cluster associated with the particular identified phrase.

13. The system of claim 12, wherein the distance between the particular phrase and the respective similar phrase is based on the distance between respective vector representations of the particular phrase and the respective similar phrase.

14. The system of claim 10, wherein the at least one memory device contains further instructions, which when executed by the processor, further cause the at least one processor to:

store a shared memory structure, the shared memory structure comprising metadata including information corresponding to a first range of locations in the shared memory structure, the first range of locations including a first set of phrases in a first language, each phrase from the first set of phrases associated with a particular set of cluster identifiers, the particular set of cluster identifiers being stored within the first range of locations in the shared memory structure.

15. The system of claim 14, wherein the metadata further includes information corresponding to a second range of locations in the shared memory structure, the second range of locations corresponding to a second set of phrases in a second language, each phrase associated with a second particular set of cluster identifiers.

16. The system of claim 10, wherein the at least one memory device contains further instructions, which when executed by the at least one processor, further cause the at least one processor to:

store a shared memory structure, wherein the shared memory structure comprises an array, the array includes at least a first phrase from a first set of phrases at a first location in the array and a first plurality of cluster identifiers associated with the first phrase at subsequent locations after the first location in the array, the array includes a second phrase from the first set of phrases at a second location in the array, the second location being after the subsequent locations of the first plurality of cluster identifiers, and the array includes a second plurality of cluster identifiers associated with the second phrase, the second plurality of cluster identifiers at subsequent locations after the second location in the array.

17. The system of claim 10, wherein the at least one memory device contains further instructions, which when executed by the at least one processor, further cause the at least one processor to:

receive a query comprising phrases;

determine cluster identifiers associated with the phrases;

search the index to retrieve document identifiers that are each associated with at least one of the cluster identifiers; and provide a set of search results corresponding to documents identified by the retrieved document identifiers.

18. The system of claim 17, wherein the at least one memory device contains further instructions, which when executed by the at least one processor, further cause the at least one processor to:

determine a particular set of documents corresponding to the retrieved document identifiers; and provide information corresponding to the particular set of documents as the set of search results.

19. A non-transitory computer-readable medium comprising instructions, which when executed by at least one computing device, cause the at least one computing device to perform operations comprising:

receiving a query comprising phrases;

determining phrase cluster identifiers associated with the phrases in the query;

searching an index to retrieve document identifiers that are each associated with at least one of the phrase cluster identifiers; and providing a set of search results corresponding to documents identified by the retrieved document identifiers.

20. The non-transitory computer-readable medium of claim 19, comprising further instructions, which when executed by the at least one computing device, cause the at least one computing device to perform further operations comprising:

prior to receiving the query:

identifying phrases from a set of documents, each of the documents being associated with a document identifier;

generating clusters of phrases from the identified phrases, each phrase contained in each respective cluster having a semantic relationship with other phrases in the respective cluster;

assigning a cluster identifier to each of the clusters of phrases; and generating the index that stores each respective cluster identifier of each respective cluster of phrases in association with each document identifier of each of the documents that includes at least one of the phrases contained in the respective cluster of phrases.

* * * * *